(12) United States Patent
Fukutake

(10) Patent No.: US 12,736,840 B2
(45) Date of Patent: Sep. 15, 2026

(54) LAMINATE, METHOD OF MANUFACTURING LAMINATE, AND METHOD OF MANUFACTURING OPTICAL MEMBER

(71) Applicant: FUJIFILM Corporation, Tokyo (JP)

(72) Inventor: Naoyuki Fukutake, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 153 days.

(21) Appl. No.: 18/891,847

(22) Filed: Sep. 20, 2024

(65) Prior Publication Data

US 2025/0013090 A1 Jan. 9, 2025

Related U.S. Application Data

(63) Continuation of application No. PCT/JP2023/010296, filed on Mar. 16, 2023.

(30) Foreign Application Priority Data

Mar. 30, 2022 (JP) ................................ 2022-056201

(51) Int. Cl.
*G02F 1/1333* (2006.01)
*B32B 7/06* (2019.01)
(Continued)

(52) U.S. Cl.
CPC .............. *G02F 1/1333* (2013.01); *B32B 7/12* (2013.01); *B32B 37/12* (2013.01);
(Continued)

(58) Field of Classification Search
CPC .......... B32B 2457/20; B32B 2457/202; B32B 38/105; B32B 2037/268; B32B 7/06; B32B 2307/748; B32B 43/006
See application file for complete search history.

(56) References Cited

U.S. PATENT DOCUMENTS 8,974,620 B2 * 3/2015 Wilson .................... G06F 3/041
156/289
10,688,712 B2 * 6/2020 Mason .................... B29C 63/02
(Continued)

FOREIGN PATENT DOCUMENTS

JP 2003-312252 A 11/2003
JP 2007-039510 A 2/2007
(Continued)

OTHER PUBLICATIONS

International Preliminary Report on Patentability (Chapter I) and Written Opinion of the International Searching Authority issued in PCT/JP2023/010296; issued Sep. 24, 2024.
(Continued)

*Primary Examiner* — Scott W Dodds
(74) *Attorney, Agent, or Firm* — Studebaker Brackett PLLC

(57) ABSTRACT

An object of the present invention is to provide a laminate where members can be peeled off in a desired peeling order, a method of manufacturing the laminate, and a method of manufacturing an optical member. The laminate according to the present invention includes, in the following order: a first member; a second member; and a third member, in which in a case where an adhesion strength in a contact surface between the first member and the second member is represented by C1, an adhesion strength in a center portion of a contact surface between the second member and the third member is represented by C21, and an adhesion strength in at least a part of an outer peripheral portion positioned outside the center portion of the contact surface between the second member and the third member is represented by C22, a requirement of Expression (1) is satisfied, Expression (1) C22>C1>C21.

1 Claim, 3 Drawing Sheets

(51) Int. Cl.

| | |
|---|---|
| ***B32B 7/12*** | (2006.01) |
| ***B32B 37/12*** | (2006.01) |
| ***B32B 38/00*** | (2006.01) |
| ***B32B 43/00*** | (2006.01) |
| *B32B 37/26* | (2006.01) |

(52) U.S. Cl.

CPC ........ *B32B 38/0004* (2013.01); *B32B 43/006* (2013.01); *B32B 7/06* (2013.01); *B32B 2037/268* (2013.01); *B32B 2307/748* (2013.01); *B32B 2457/202* (2013.01); *B32B 2551/00* (2013.01); *G02F 2202/28* (2013.01)

(56) References Cited

U.S. PATENT DOCUMENTS

| | | | | |
|---|---|---|---|---|
| 2003/0198756 | A1 | 10/2003 | Weisser et al. | |
| 2013/0309433 | A1* | 11/2013 | Hsu | C09J 7/38 428/38 |
| 2018/0277573 | A1* | 9/2018 | Emori | B32B 15/08 |
| 2020/0307155 | A1* | 10/2020 | Yasui | B32B 17/10 |
| 2022/0059796 | A1* | 2/2022 | Kim | B32B 27/08 |

FOREIGN PATENT DOCUMENTS

| | | | |
|---|---|---|---|
| JP | 2008-050471 | A | 3/2008 |
| JP | 2012-025813 | A | 2/2012 |
| JP | 2020-033400 | A | 3/2020 |
| WO | 2017/145734 | A1 | 8/2017 |

OTHER PUBLICATIONS

International Search Report issued in PCT/JP2023/010296, mailed Jun. 20, 2023.

* cited by examiner

LAMINATE, METHOD OF MANUFACTURING LAMINATE, AND METHOD OF MANUFACTURING OPTICAL MEMBER

CROSS-REFERENCE TO RELATED APPLICATIONS

This application is a Continuation of PCT International Application No. PCT/JP2023/010296 filed on Mar. 16, 2023, which claims priority under 35 U.S.C. § 119(a) to Japanese Patent Application No. 2022-056201 filed on Mar. 30, 2022. The above applications are hereby expressly incorporated by reference, in their entirety, into the present application.

BACKGROUND OF THE INVENTION

1. Field of the Invention

The present invention relates to a laminate, a method of manufacturing the laminate, and a method of manufacturing an optical member.

2. Description of the Related Art

An optical member obtained by bonding a member such as a lens, a display, or a light guide plate and a laminate including a protective layer is known.

As the laminate used for manufacturing the optical member, JP2020-033400A discloses "a laminate including: a reinforcing film that includes a first film substrate and a first adhesive layer fixed to and laminated on a first main surface of the first film substrate; a separator that is temporarily bonded to the first adhesive layer; and a surface protective film that is temporarily bonded a second main surface of the first film substrate, in which the first adhesive layer has a characteristic where an adhesive strength increases by heating or light irradiation, and an adhesive strength between the first adhesive layer and the separator is lower than an adhesive strength between the surface protective film and the first film substrate" (claim 1 of JP2020-033400A).

SUMMARY OF THE INVENTION

As disclosed in JP2020-033400A, in a case where members are peeled off using a laminate including a contact surface having a high adhesion strength between members and a contact surface having a low adhesion strength, typically, peeling occurs first from the contact surface having a low adhesion strength between the members. Specifically, in a laminate obtained by simply bonding a first member, a second member, and a third member in this order, in a case where an adhesion strength of a contact surface between the second member and the third member is lower than an adhesion strength of a contact surface between the first member and the second member, typically, the third member is peeled off before the first member.

However, depending on the use of the laminate or the like, as described above, a laminate where the first member that is typically supposed to be peeled off after the third member can be peeled off before the third member is required. In the present specification, "the laminate where the first member that is typically supposed to be peeled off after the third member can be peeled off before the third member" will also be referred to as "the laminate where members can be peeled off in a desired peeling order".

Accordingly, an object of the present invention is to provide a laminate where members can be peeled off in a desired peeling order, a method of manufacturing the laminate, and a method of manufacturing an optical member.

In order to achieve the object, the present inventors conducted a thorough investigation and found that, in a laminate including a first member, a second member, and a third member in this order, in a case where an adhesion strength in a predetermined portion of a contact surface between members satisfies a predetermined relationship, the members can be peeled off in a desired peeling order, that is, in order from the first member that is desired to be peeled off first, thereby completing the present invention.

That is, the present inventors found that the object can be achieved by the following configurations.

[1] A laminate comprising, in the following order:
a first member;
a second member; and
a third member,
in which in a case where an adhesion strength in a contact surface between the first member and the second member is represented by C1, an adhesion strength in a center portion of a contact surface between the second member and the third member is represented by C21, and an adhesion strength in at least a part of an outer peripheral portion positioned outside the center portion of the contact surface between the second member and the third member is represented by C22, a requirement of Expression (1) is satisfied, $$C22 > C1 > C21. \qquad \text{Expression (1)}$$

[2] The laminate according to [1],
in which the first member includes a first protective film and a pressure-sensitive adhesive layer,
the second member includes a substrate and a liquid crystal layer,
the third member includes a second protective film,
the pressure-sensitive adhesive layer in the first member is disposed on the second member side further than the first protective film in the first member, and
the liquid crystal layer in the second member is disposed on the third member side further than the substrate in the second member.

[3] A method of manufacturing a laminate, the method comprising:
a step of cutting a laminated sheet including a first member, a second member, and a third member in this order with a laser to obtain the laminate according to [1] or [2],
in which in the laminated sheet, in a case where an adhesion strength in a contact surface between the first member and the second member is represented by C1 and an adhesion strength in a contact surface between the second member and the third member is represented by C2, a relationship of Expression (2) is satisfied, $$C1 > C2. \qquad \text{Expression (2)}$$

[4] A method of manufacturing an optical member, the method comprising:

a step 1 of peeling off the first member from the laminate according to [1] or [2] to obtain a laminated member where the second member and the third member are laminated in this order;

a step 2 of obtaining a bonded material by bonding the laminated member and a bonding target such that the bonding target and the second member face each other; and a step 3 of peeling off the third member from the bonded material to obtain an optical member.

According to the present invention, it is possible to provide a laminate where members can be peeled off in a desired peeling order, a method of manufacturing the laminate, and a method of manufacturing an optical member.

BRIEF DESCRIPTION OF THE DRAWINGS

FIG. 1 is a schematic partially cross-sectional view showing an example of a laminate according to the present invention.

FIG. 2 is a schematic cross-sectional view showing an example of a laminated sheet using a method of manufacturing the present laminate.

DESCRIPTION OF THE PREFERRED EMBODIMENTS

Figures 3, 4, 5:
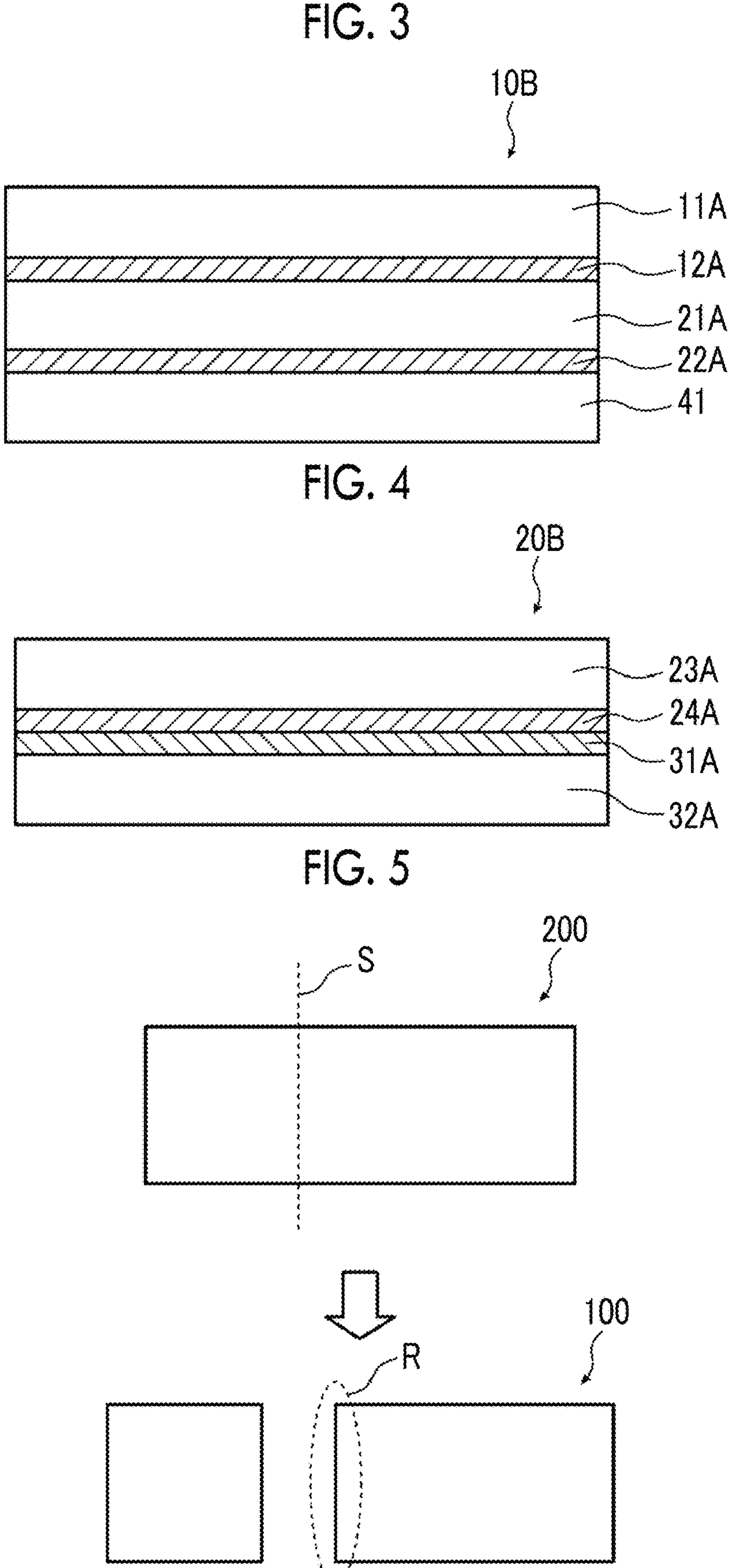
FIG. 3 is a schematic cross-sectional view showing a sheet used for manufacturing the laminated sheet.
FIG. 4 is a schematic cross-sectional view showing the sheet used for manufacturing the laminated sheet.
FIG. 5 is a schematic cross-sectional view showing a step of irradiating the laminated sheet with a laser to obtain a laminate.

Hereinafter, the details of the present invention will be described.

The following description regarding configuration requirements has been made based on a representative embodiment of the present invention. However, the present invention is not limited to the embodiment.

In the present specification, numerical ranges represented by "to" include numerical values before and after "to" as lower limit values and upper limit values. In a numerical range described in a stepwise manner in the present specification, an upper limit value or a lower limit value described in a certain numerical range may be replaced with an upper limit value or a lower limit value in another numerical range described in a stepwise manner. In addition, regarding a numerical range described in the present specification, an upper limit value or a lower limit value described in a numerical range may be replaced with a value described in Examples.

In the present specification, materials that correspond to each of components may be used alone or in combination of two or more kinds. Here, in a case where two or more kinds of materials are used in combination for each of components, the content of the component refers to the total content of the two or more materials unless specified otherwise.

In the present specification, a combination of two or more preferable aspects is a more preferable aspect.

In the present specification, the meaning of the term "step" includes not only an independent step but also a step whose intended purpose is achieved even in a case in which the step is not clearly distinguished from other steps.

In the present specification, thicknesses of a laminate and each of members (layers) in the laminate are an arithmetic mean value of thicknesses at ten points obtained by acquiring a cross-sectional image of the laminate using a scanning electron microscope (SEM) and measuring the thicknesses at the ten points of different positions of a portion corresponding to the thickness of a measurement target.

[Laminate]

A laminate according to an embodiment of the present invention (hereinafter, also referred to as "present laminate") comprises, in the following order: a first member; a second member; and a third member, in which in a case where an adhesion strength in a contact surface between the first member and the second member is represented by C1, an adhesion strength in a center portion of a contact surface between the second member and the third member is represented by C21, and an adhesion strength in at least a part of an outer peripheral portion positioned outside the center portion of the contact surface between the second member and the third member is represented by C22, a requirement of Expression (1) is satisfied.

$$C22 > C1 > C21 \quad \text{Expression (1)}$$

By using the present laminate, the members in the present laminate can be peeled off in a desired peeling order, that is, the first member can be peeled off first from the present laminate. The reason for this is presumed to be as follows.

In a case where members are peeled off from a laminate, a force is likely to be applied to an outer peripheral portion of a contact surface between the members. Therefore, the outer peripheral portion of the contact surface is likely to be peeled off. In the present laminate, the adhesion strength in the outer peripheral portion of the contact surface between the second member and the third member is higher than the adhesion strength of the contact surface (the entire contact surface) between the first member and the second member. Therefore, it is presumed that peeling of the third member before the first member can be suppressed.

Figures 1, 2:
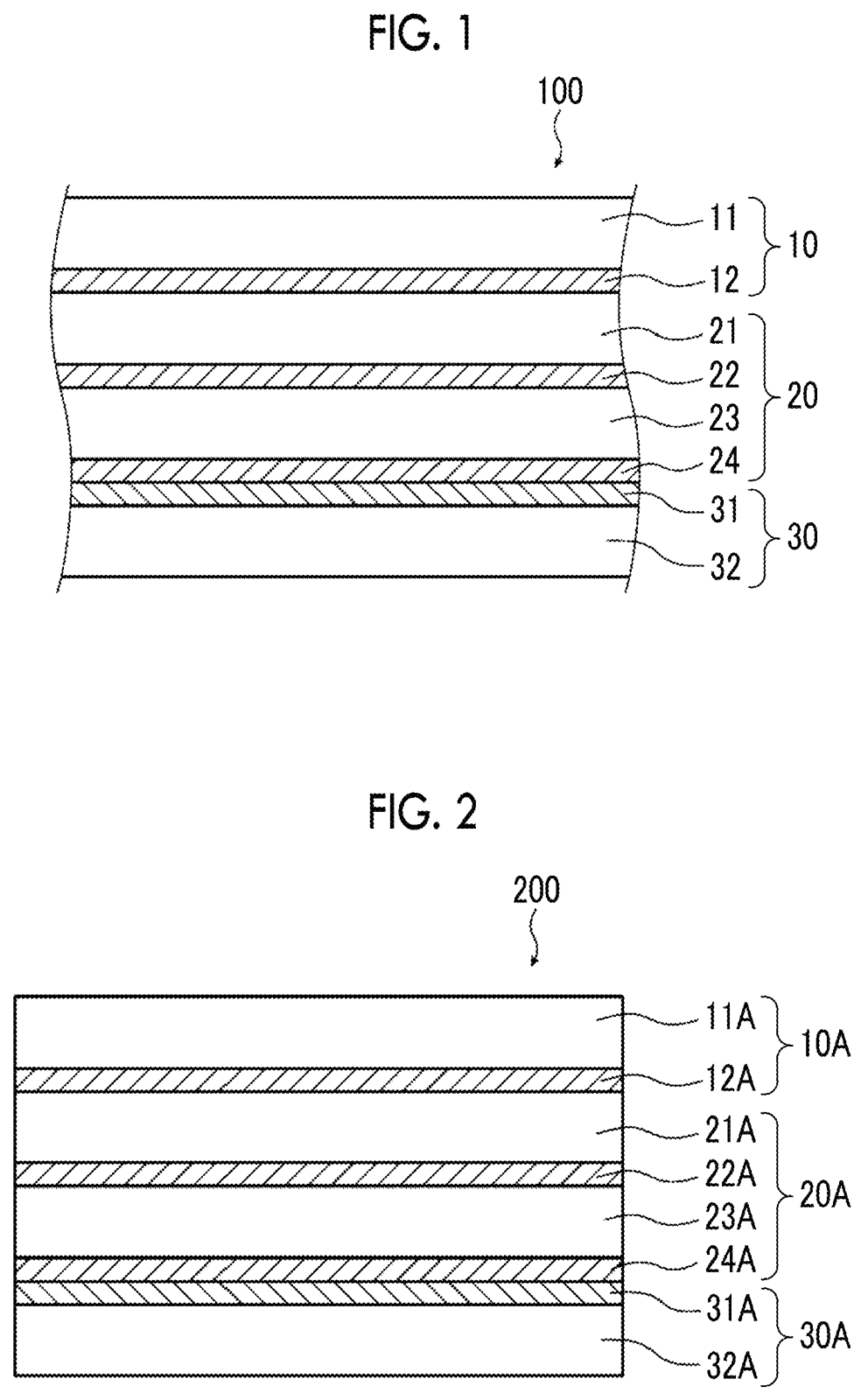

FIG. 1 is a schematic partially cross-sectional view showing an example of the present laminate. FIG. 1 illustrates a cross section of a laminate 100 in the vicinity of a center in a plan view of the laminate 100.

The laminate 100 shown in FIG. 1 includes a first protective film 11, a first pressure-sensitive adhesive layer 12, a substrate 21, an adhesion layer 22, a liquid crystal layer 23, a second pressure-sensitive adhesive layer 24, a release layer 31, and a second protective film 32 in this order, and these members are laminated such that adjacent members are in contact with each other.

A first member 10 includes the first protective film 11 and the first pressure-sensitive adhesive layer 12, a second member 20 includes the substrate 21, the adhesion layer 22, the liquid crystal layer 23, and the second pressure-sensitive adhesive layer 24, and a third member 30 includes the release layer 31 and the second protective film 32.

A shape of the laminate 100 observed from a laminating direction of the members is not particularly limited, and examples thereof include a polygonal shape, a circular shape, an elliptical shape, and an unstructured shape. Among these, a polygonal shape is preferable, and a rectangular shape is more preferable.

An equivalent circle diameter of the shape of the laminate 100 observed from the laminating direction of the members is preferably 5 to 100 mm, more preferably 10 to 70 mm, and still more preferably 30 to 60 mm.

A thickness of the laminate 100 is preferably 50 to 500 μm and more preferably 100 to 200 μm.

Hereinafter, each of the members included in the laminate 100 will be described in detail.

<First Member>

The first member 10 is disposed on a surface of the second member 20 opposite to a surface where the third member 30 is disposed. The first member 10 is peeled off from the laminate 100 before the third member 30 during manufacturing of an optical member (described below).

In the example shown in FIG. 1, the first member 10 includes the first protective film 11 and the first pressure-sensitive adhesive layer 12.

A thickness of the first member 10 is preferably 20 to 120 μm and more preferably 40 to 70 μm.

(First Protective Film)

The first protective film 11 is bonded to the second member 20 through the first pressure-sensitive adhesive layer 12. Since the laminate 100 includes the first protective film 11, damage to one surface of the second member 20 is suppressed.

Specific examples of a material forming the first protective film include polyolefin (for example, polyethylene or polypropylene), cyclic polyolefin (for example, a norbornene-based polymer), polyvinyl alcohol, polyester (for example, polyethylene terephthalate (PET), polybutylene terephthalate, or polyethylene naphthalate), polymethacrylic acid ester, polyacrylic acid ester, cellulose ester (for example, triacetyl cellulose (TAC), diacetyl cellulose, or cellulose acetate propionate), and polycarbonate. In particular, from the viewpoint of excellent strength, polyester or cellulose ester is preferable.

From the viewpoint of excellent strength and workability, a thickness of the first protective film 11 is preferably 10 to 100 μm and more preferably 30 to 50 μm.

(First Pressure-Sensitive Adhesive Layer)

The first pressure-sensitive adhesive layer 12 bonds the first protective film 11 and the second member 20 to each other.

In the present specification, the pressure-sensitive adhesive layer refers to a layer formed of a pressure sensitive adhesive.

The first pressure-sensitive adhesive layer 12 may be formed one entire surface of the first protective film 11 or may be formed on at least a part of one surface of the first protective film 11.

Specific examples of the pressure sensitive adhesive forming the first pressure-sensitive adhesive layer 12 include a rubber-based pressure sensitive adhesive, an acrylic pressure sensitive adhesive, a silicone-based pressure sensitive adhesive, a urethane-based pressure sensitive adhesive, a vinyl alkyl ether-based pressure sensitive adhesive, a polyvinyl alcohol-based pressure sensitive adhesive, and a cellulose-based pressure sensitive adhesive. Among these, from the viewpoint of further improving the effect of the present invention, an acrylic pressure sensitive adhesive is preferable.

A thickness of the first pressure-sensitive adhesive layer 12 is not particularly limited and is preferably 5 to 30 μm and more preferably 10 to 20 μm from the viewpoint of further improving the effect of the present invention.

<Second Member>

In the second member 20, the first member 10 is disposed on one surface, and the third member 30 is disposed on another surface. The second member 20 is a member that is bonded to a bonding target during manufacturing of an optical member (described below).

In the example shown in FIG. 1, the second member 20 includes the substrate 21, the adhesion layer 22, the liquid crystal layer 23, and the second pressure-sensitive adhesive layer 24.

A thickness of the second member 20 is preferably 10 to 90 μm and more preferably 30 to 70 μm.

It is preferable that a shape and a size of the contact surface between the first member 10 and the second member 20 are the same as the shape and the size of the laminate 100 observed from the laminating direction of the members.

(Substrate)

In the substrate 21, the first protective film 11 is bonded to one surface through the first pressure-sensitive adhesive layer 12, and the liquid crystal layer 23 is bonded to another surface through the adhesion layer 22.

The substrate 21 is used as, for example, a support that supports the liquid crystal layer 23 or a protective layer for protecting the liquid crystal layer 23 after peeling off the first member 10 from the laminate 100.

Examples of a material forming the substrate 21 include the examples of the material forming the first protective film 11. In particular, from the viewpoint of light transmittance, polymethacrylic acid ester, polyacrylic acid ester, or cellulose ester is preferable.

The substrate 21 is preferably transparent. In the present specification, the term "transparent" represents that a visible light average transmittance is 80% or more, preferably 90% or more, and more preferably 95% or more. In the present specification, the value of the visible light average transmittance being X % or more represents that, in a case where a transmittance is obtained per nm in a wavelength range of 380 to 780 nm, all of the transmittances at the wavelengths are X % or more.

A thickness of the substrate 21 is not particularly limited and, from the viewpoint of further improving the effect of the present invention, is preferably 10 to 100 μm and more preferably 20 to 40 μm.

The example of FIG. 1 illustrates the case where the laminate 100 includes the substrate 21. However, the laminate 100 does not need to include the substrate 21.

(Adhesion Layer)

The adhesion layer 22 bonds the substrate 21 and the liquid crystal layer 23 to each other.

In the present specification, the adhesion layer is a concept including an adhesive layer and the above-described pressure-sensitive adhesive layer. In addition, the adhesive layer refers to a layer obtained using an adhesive.

The adhesion layer 22 is preferably an adhesive layer from the viewpoint that the substrate 21 and the liquid crystal layer 23 can be more strongly bonded to each other.

In a case where the laminate 100 is observed from the laminating direction of the members, the adhesion layer 22 may be formed in the entire region where the substrate 21 and the liquid crystal layer 23 overlap each other or may be formed in at least a part of the region where the substrate 21 and the liquid crystal layer 23 overlap each other.

In a case where the adhesion layer 22 is an adhesive layer, examples of an adhesive used for forming the adhesion layer include a polyvinyl alcohol (PVA)-based adhesive and a curable adhesive.

As the curable adhesive, an active energy ray-curable adhesive is preferable, and an ultraviolet (UV)-curable adhesive is more preferable.

Examples of the UV curable adhesive include a radical polymerization-curable adhesive and a cationic polymerization-curable adhesive.

Examples of the radical polymerization-curable adhesive include a (meth)acrylate-based adhesive. Examples of a curable component in the (meth)acrylate-based adhesive include a compound having a (meth)acryloyl group and a compound having a vinyl group.

Examples of the cationic polymerization-curable adhesive include a compound having an epoxy group or an oxetanyl group. The compound having an epoxy group is not particularly limited as long as the compound has at least two epoxy groups in a molecule, and various generally known curable epoxy compounds can be used. Specific examples of the compound having an epoxy group include a compound (aromatic epoxy compound) having at least two epoxy groups and at least one aromatic ring in the molecule and a compound (alicyclic epoxy compound) having at least two epoxy groups in a molecule, in which at least one of the epoxy groups is formed between two adjacent carbon atoms forming an alicyclic ring.

In a case where the adhesion layer 22 is a pressure-sensitive adhesive layer, specific examples of the pressure sensitive adhesive forming the pressure-sensitive adhesive layer are the same as those of the pressure-sensitive adhesive exemplified in the description of the first pressure-sensitive adhesive layer, and a preferable aspect thereof is also the same.

A thickness of the adhesion layer 22 is not particularly limited and is preferably 5 to 30 μm and more preferably 10 to 20 μm from the viewpoint that the substrate 21 and the liquid crystal layer 23 can be more strongly bonded to each other.

The example of FIG. 1 illustrates the case where the laminate 100 includes the adhesion layer 22. However, in a case where the laminate 100 does not include the substrate 21, the laminate 100 does not need to include the adhesion layer 22.

(Liquid Crystal Layer)

In the liquid crystal layer 23, the substrate 21 is bonded to one surface through the adhesion layer 22, and the third member 30 is bonded to another surface through the second pressure-sensitive adhesive layer 24 and the release layer 31.

A configuration of the liquid crystal layer 23 is not particularly limited as long as the liquid crystal layer 23 is formed of a liquid crystal compound. The liquid crystal layer 23 is, for example, preferably a layer obtained by immobilizing an aligned liquid crystal compound and more preferably a layer that is formed by immobilizing a liquid crystal compound having a polymerizable group by polymerization. In other words, the liquid crystal layer 23 is preferably a so-called optically-anisotropic layer.

In the present specification, the "immobilized" state is a state where the alignment of the liquid crystal compound is maintained. Specifically, the "immobilized" state is preferably a state where an immobilized alignment form can be stably maintained while the layer has no fluidity in a temperature range of usually 0° C. to 50° C., and −30° C. to 70° C. under more severe conditions and there is no change in alignment form by an external field or an external force.

The kind of the liquid crystal compound is not particularly limited, and the liquid crystal compound can be generally classified into a rod-like liquid crystal compound and a disk-like liquid crystal compound by the shape thereof. Further, the liquid crystal compound can also be classified into a low molecular weight type and a polymer type. In general, the polymer refers to a compound having a polymerization degree of 100 or higher (Polymer Physics-Phase Transition Dynamics, Masao Doi, page 2, Iwanami Shoten Publishers, 1992). In the present invention, any of the liquid crystal compounds can also be used, but a rod-like liquid crystal compound or a discotic liquid crystal (disk-like liquid crystal compound) is preferable. In addition, a liquid crystal compound having a relatively low molecular weight and a polymerization degree of less than 100 that is a monomer is preferable.

The liquid crystal compound preferably has a polymerizable group. That is, the liquid crystal compound is preferably a polymerizable liquid crystal compound. Examples of the polymerizable group in the polymerizable liquid crystal compound include an acryloyl group, a methacryloyl group, an epoxy group, and a vinyl group.

By polymerizing the polymerizable liquid crystal compound, the alignment of the liquid crystal compound can be immobilized. After immobilizing the liquid crystal compound by polymerization, it is no longer necessary to exhibit liquid crystallinity.

Examples of the alignment state that can be taken by the liquid crystal compound include homogeneous alignment, homeotropic alignment, hybrid alignment, twisted alignment, and tilt alignment. The twisted alignment represents an alignment state in which a liquid crystal compound is twisted from one main surface to another main surface of an optically-anisotropic layer with a thickness direction of the optically-anisotropic layer as a rotation axis. In the twisted alignment, a twisted angle of the liquid crystal compound (twisted angle of the liquid crystal compound in an alignment direction) is typically more than 0° and 360° or less in many cases.

In addition, examples of the liquid crystal layer having the other alignment state include a liquid crystal layer having a liquid crystal alignment pattern in which an orientation of an optical axis derived from the liquid crystal compound changes while continuously rotating in at least one in-plane direction. A configuration of the liquid crystal layer having the liquid crystal alignment pattern is specifically disclosed in, for example, WO2019/189809A.

A thickness of the liquid crystal layer 23 is not particularly limited, and is preferably 1 to 50 μm and more preferably 1 to 10 μm.

(Second Pressure-Sensitive Adhesive Layer)

The second pressure-sensitive adhesive layer 24 has a function of bonding the liquid crystal layer 23 and the third member 30 (protective film 32).

Specific examples of the pressure sensitive adhesive forming the second pressure-sensitive adhesive layer 24 are the same as those of the pressure-sensitive adhesive exemplified in the description of the first pressure-sensitive adhesive layer 12, and a preferable aspect thereof is also the same.

Here, as the second pressure-sensitive adhesive layer 24, a pressure sensitive adhesive having a higher adhesive strength than the first pressure-sensitive adhesive layer 12 is preferable. Specifically, in a case where the pressure sensitive adhesive forming the first pressure-sensitive adhesive layer 12 is a silicone-based pressure sensitive adhesive, the pressure sensitive adhesive forming the second pressure-sensitive adhesive layer 24 is preferably an acrylic pressure sensitive adhesive.

In a case where the laminate 100 is observed from the laminating direction of the members, the second pressure-sensitive adhesive layer 24 may be formed in the entire region where the liquid crystal layer 23 and the second protective film 32 overlap each other or may be formed in at least a part of the region where the liquid crystal layer 23 and the second protective film 32 overlap each other. It is preferable that the second pressure-sensitive adhesive layer 24 is formed in the entire region where the liquid crystal layer 23 and the second protective film 32 overlap each other.

A thickness of the second pressure-sensitive adhesive layer 24 is not particularly limited and is preferably 5 to 40 μm and more preferably 5 to 20 μm from the viewpoint of further improving the effect of the present invention.

<Third Member>

The third member 30 is disposed on a surface of the second member 20 opposite to a surface where the first member 10 is disposed. The third member 30 is peeled off from the laminate 100 after the first member 10 during manufacturing of an optical member (described below).

In the example of FIG. 1, the third member 30 includes the release layer 31 and the second protective film 32.

A thickness of the third member 30 is preferably 10 to 100 μm and more preferably 30 to 50 μm.

It is preferable that a shape and a size of the contact surface between the second member 20 and the third member 30 are the same as the shape and the size of the laminate 100 observed from the laminating direction of the members.

(Release Layer)

The release layer 31 is a layer for facilitating the peeling of the third member 30 during manufacturing of an optical member (described below).

Here, the third member 30 may include the release layer 31 such that the third member 30 is likely to be peeled off before the first member 10.

This problem can be solved, for example, by disposing the release layer 31 in the center portion of the contact surface between the second member 20 (in particular, the liquid crystal layer 23) and the third member 30 (in particular, the second protective film 32) and bonding the liquid crystal layer 23 and the second protective film 32 to each other through the second pressure-sensitive adhesive layer 24 in at least a part of the outer peripheral portion positioned outside the center portion of the contact surface without disposing the release layer 31.

That is, even in a case where the laminate 100 including the release layer 31 is used, the adhesion strength between the liquid crystal layer 23 and the second protective film 32 is improved due to the action of the second pressure-sensitive adhesive layer 24 in the outer peripheral portion of the contact surface. Therefore, the first member 10 can be peeled off before the third member 30.

Accordingly, in the laminate 100, by disposing the release layer 31 in the center portion of the contact surface and bonding the liquid crystal layer 23 and the second protective film 32 to each other through the second pressure-sensitive adhesive layer 24 in at least a part of the outer peripheral portion of the contact surface without disposing the release layer 31, a laminate that satisfies the relationship of Expression (1) can be easily obtained.

As described below, in order to obtain laminate having the above-described configuration, by preparing a laminated sheet having a predetermined configuration and cutting the laminated sheet with a laser, in the vicinity of a laser-irradiated portion of the laminated sheet, the release layer is decomposed and deteriorates due to the heat of the laser, at least a part of the release layer is removed, and thus the above-described laminate can be obtained.

In the outer peripheral portion of the contact surface, the second pressure-sensitive adhesive layer 24 may be disposed in a portion where the peeling of the third member 30 starts without disposing the release layer 31 in the portion where the peeling of the third member 30 starts during manufacturing of an optical member (described below). It is preferable that the second pressure-sensitive adhesive layer 24 is disposed in the entire outer peripheral portion without disposing the release layer 31 in the entire outer peripheral portion.

The outer peripheral portion positioned outside the center portion of the contact surface between the second member 20 (in particular, the liquid crystal layer 23) and the third member 30 (in particular, the second protective film 32) refers to a region of less than 100 μm from an outer edge of the contact surface between the second member 20 and the third member 30 toward the center of the contact surface.

In addition, the center portion of the contact surface between the second member 20 (in particular, the liquid crystal layer 23) and the third member 30 (in particular, the second protective film 32) refers to a region of the contact surface other than the outer peripheral portion.

The release layer 31 is preferably a layer formed of a silicone resin, a fluororesin, an alkyd resin, various waxes, or an aliphatic olefin, and more preferably a layer formed of a silicone resin.

The silicone resin refers to a resin having a silicone structure in a molecule. Examples of the silicone resin include a curable silicone resin, a silicone graft resin, and a modified silicone resin such as an alkyl-modified silicone resin, and a reactive curable silicone resin is preferable.

Examples of the reactive curable silicone resin include an addition reaction type silicone resin, a condensation reaction type silicone resin, and an ultraviolet or electron beam-curable silicone resin. Among these, an addition reaction type silicone resin or an ultraviolet or electron beam-curable silicone resin having low-temperature curing properties is preferable from the viewpoint that the release layer 31 can be formed at a low temperature.

Examples of the addition reaction type silicone resin include a resin obtained by causing polydimethylsiloxane in which a vinyl group is introduced into a terminal or a side chain to react with hydrogen siloxane using a platinum catalyst for curing.

Examples of the condensation reaction type silicone resin include a resin having a three-dimensional crosslinking structure formed by a condensation reaction of polydimethylsiloxane having an OH group at a terminal and polydimethylsiloxane having an H group at a terminal using an organotin catalyst.

Examples of the ultraviolet-curable silicone resin include a silicone resin that uses the same radical reaction as silicone rubber crosslinking, a silicone resin that is photocured by introducing an unsaturated group, a silicone resin that decomposes an onium salt with an ultraviolet ray or an electron beam to produce a strong acid and cleaves an epoxy group for crosslinking, and a silicone resin that is crosslinked by an addition reaction of thiol to vinylsiloxane. More specifically, acrylate-modified polydimethylsiloxane or glycidoxy-modified polydimethylsiloxane is used.

From the viewpoint of further improving the effect of the present invention, a thickness of the release layer 31 is preferably 5 to 100 nm and more preferably 20 to 70 nm.

In particular, in a case where the release layer 31 is disposed in the center portion of the contact surface between the second member 20 and the third member 30 and the second pressure-sensitive adhesive layer 24 is disposed in at least a part of the outer peripheral portion of the contact surface, as long as the thickness of the release layer 31 is 100 nm or less, the distance between the second pressure-sensitive adhesive layer 24 and the second protective film 32 in the outer peripheral portion of the contact surface is short. As a result, the adhesion strength of the outer peripheral portion of the contact surface can be improved.

In addition, as long as the thickness of the release layer 31 is 100 nm or less and the thickness of the second pressure-sensitive adhesive layer 24 is 5 μm or more, during the cutting of the laminated sheet with a laser in a method of manufacturing the laminate described below, the release layer in the outer peripheral portion of the contact surface between the second member and the third member is more likely to be removed as compared to the second pressure-sensitive adhesive layer in the outer peripheral portion.

The example of FIG. 1 illustrates the case where the laminate 100 includes the release layer 31. As long as the third member 30 can be peeled off after peeling off the first member 10 during manufacturing of an optical member (described below), the laminate 100 does not need to include the release layer 31.

(Second Protective Film)

The second protective film 32 is bonded to the liquid crystal layer 23 through the release layer 31 and the second pressure-sensitive adhesive layer 24. Since the laminate 100 includes the second protective film 32, damage to another surface of the second member 20 (in particular, the liquid crystal layer 23) is suppressed.

Specific examples of a material forming the second protective film 32 are the same as those of the material exemplified in the description of the first protective film 11, and a preferable aspect thereof is also the same.

From the viewpoint of excellent strength and workability, a thickness of the second protective film 32 is preferably 10 to 100 μm and more preferably 30 to 50 μm.

<Adhesion Strength>

In the laminate 100, in a case where an adhesion strength in a contact surface between the first member 10 and the second member 20 is represented by C1, an adhesion strength in the center portion of the contact surface between the second member 20 and the third member 30 is represented by C21, and an adhesion strength in at least a part of the outer peripheral portion positioned outside the center portion of the contact surface between the second member 20 and the third member 30 is represented by C22, a requirement of Expression (1) is satisfied.

$$C22 > C1 > C21 \quad \text{Expression (1)}$$

In the present specification, the adhesion strength refers to a peeling strength (N/25 mm) measured under a condition of a clamp moving speed of 300 mm/min in a 180 degree peeling test according to JIS K6854-2:1999.

The adhesion strength C1 refers to an adhesion strength in the entire contact surface between the first member 10 and the second member 20 and is preferably 0.10 to 0.40 N/25 mm, preferably 0.10 to 0.30 N/25 mm, and preferably 0.10 to 0.20 N/25 mm.

The adhesion strength C21 is preferably 0.01 to 0.10 N/25 mm, more preferably 0.01 to 0.07 N/25 mm, and still more preferably 0.01 to 0.05 N/25 mm.

The adhesion strength C22 is preferably 0.15 to 10.00 N/25 mm, more preferably 0.20 to 5.00 N/25 mm, and still more preferably 0.30 to 1.00 N/25 mm.

Here, in the laminate 100, the contact surface between the first member 10 and the second member 20 is an interface between the first pressure-sensitive adhesive layer 12 and the substrate 21.

It is preferable that the contact surface between the second member 20 and the third member 30 is an interface between the second pressure-sensitive adhesive layer 24 and the release layer 31 in the center portion and is an interface between the second pressure-sensitive adhesive layer 24 and the second protective film 32 in the outer peripheral portion. As described above, as long as the release layer 31 is disposed in the center portion of the contact surface and the second pressure-sensitive adhesive layer 24 is disposed in at least a part of the outer peripheral portion of the contact surface, a laminate that satisfies the relationship of Expression (1) can be easily obtained.

[Method of Manufacturing Laminate]

A method of manufacturing the present laminate comprises: a step of cutting a laminated sheet including a first member, a second member, and a third member in this order with a laser to obtain the present laminate, in the laminated sheet, in a case where an adhesion strength in a contact surface between the first member and the second member is represented by C1 and an adhesion strength in a contact surface between the second member and the third member is represented by C2, a relationship of Expression (2) is satisfied.

$$C1>C2 \quad \text{Expression (2)}$$

<Laminated Sheet>

FIG. 2 is a schematic cross-sectional view showing an example of the laminated sheet using the method of manufacturing the present laminate.

As shown in FIG. 2, a laminated sheet 200 shown in FIG. 1 includes a first protective film 11A, a first pressure-sensitive adhesive layer 12A, a substrate 21A, an adhesion layer 22A, a liquid crystal layer 23A, a second pressure-sensitive adhesive layer 24A, a release layer 31A, and a second protective film 32A in this order, and these members are laminated such that adjacent members are in contact with each other.

A first member 10A includes the first protective film 11A and the first pressure-sensitive adhesive layer 12A, a second member 20A includes the substrate 21A, the adhesion layer 22A, the liquid crystal layer 23A, and the second pressure-sensitive adhesive layer 24A, and a third member 30A includes the release layer 31A and the second protective film 32A.

The laminated sheet 200 is different from the laminate 100 in that the release layer 31A is disposed the entire one surface of the second protective film 32A.

Since a material forming each of the members in the laminated sheet 200 is the same as the material forming the member having the same name in the laminate 100 of FIG. 1, the description thereof will not be repeated.

(Adhesion Strength)

In the laminated sheet 200, in a case where an adhesion strength in a contact surface between the first member 10A and the second member 20A is represented by C1 and an adhesion strength in a contact surface between the second member 20A and the third member 30A is represented by C2, a relationship of Expression (2) is satisfied.

$$C1 > C2 \quad \text{Expression (2)}$$

The adhesion strength C1 in the laminated sheet 200 refers to an adhesion strength in the entire contact surface between the first member 10A and the second member 20A, and has the same definition as the adhesion strength C1 described in the laminate 100.

The adhesion strength C2 refers to an adhesion strength in the entire contact surface between the second member 20A and the third member 30A, and the value of the adhesion strength C2 is the same as the value of the adhesion strength C21 described in the laminate 100. That is, in the laminated sheet 200, an adhesion strength in a center portion of the contact surface between the second member 20A and the third member 30A is the same as an adhesion strength in an outer peripheral portion of the contact surface between the second member 20A and the third member 30A.

As shown in Expression (2), in the laminated sheet 200, the third member 30A is more likely to peel off as compared to the first member 10A.

(Method of Manufacturing Laminated Sheet)

An example of a method of manufacturing the laminated sheet will be described with reference to the drawings.

FIG. 3 is a schematic cross-sectional view showing a sheet 10B used for manufacturing the laminated sheet 200, and FIG. 4 is a schematic cross-sectional view of a sheet 20B used for manufacturing the laminated sheet 200.

The sheet 10B includes the first protective film 11A, the first pressure-sensitive adhesive layer 12A, the substrate 21A, the adhesion layer 22A, and a peeling film 41 in this order. Since a material forming each of the members in the sheet 10B other than the peeling film 41 is the same as the material forming the member having the same name in the laminate 100, the description thereof will not be repeated.

Examples of a material forming the peeling film 41 are the same as those of the material exemplified in the description of the first protective film 11, and a preferable aspect thereof is also the same.

The sheet 20B includes the liquid crystal layer 23A, the second pressure-sensitive adhesive layer 24A, the release layer 31A, and the second protective film 32A, in this order. Since a material forming each of the members in the sheet 20B is the same as the material forming the member having the same name in the laminate 100, the description thereof will not be repeated.

In the method of manufacturing the laminated sheet 200, the sheet 10B from which the peeling film 41 is peeled off and the sheet 20B are bonded such that the adhesion layer 22A and the liquid crystal layer 23A face each other. As a result, the laminated sheet 200 shown in FIG. 2 is obtained.

The bonding method is not particularly limited, and the sheets may be simply laminated or may be pressurized using a roller or the like during the lamination. In addition, bonding may be accompanied by heating.

<Step>

By cutting the laminated sheet with a laser, the present laminate is obtained. In the vicinity of a laser-irradiated portion of the laminated sheet (that is, corresponding to the vicinity of the periphery of the present laminate), there is a portion where the adhesion strength changes as compared to before the irradiation of the laser.

FIG. 5 is a schematic cross-sectional view showing a step of irradiating the laminated sheet 200 with a laser to obtain the laminate 100. As shown in FIG. 5, in a case where the laminated sheet 200 is irradiated with a laser, the laminated sheet 200 is cut at the laser-irradiated portion S such that the laminate 100 is formed. Here, in the vicinity R of the laser-irradiated portion in the laminate 100, at least a part of the release layer 31A in the laminated sheet 200 is removed. As a result, in the outer peripheral portion of the contact surface between the second member 20 and the third member 30 in the laminate 100 (corresponding to the periphery R of the laser-irradiated portion), there is a portion where the liquid crystal layer 23 and the second protective film 32 are bonded through second pressure-sensitive adhesive layer 24 without the release layer 31 interposed therebetween. As a result, the adhesion strength in the outer peripheral portion of the contact surface between the second member 20 and the third member 30 is improved, and the laminate 100 that satisfies the relationship of Expression (1) is obtained.

The laser is irradiated toward the laminating direction of the members of the laminated sheet such that the obtained laser has a desired size. The laser irradiation can be carried out using a well-known laser cutting device.

The type of the laser is not particularly limited, and examples thereof include a carbon dioxide laser, a yttrium-aluminum-garnet (YAG) laser, and an excimer laser. Among these, a YAG laser is preferable from the viewpoint that the laminated sheet is easily cut and the adhesion strengths of the members can be easily adjusted so as to satisfy the relationship of Expression (1).

An output of the laser (in particular, in a case where the YAG laser is used) is preferably 1 to 100 W, more preferably 1 to 10 W, and still more preferably 1 to 5 W.

A scanning speed of the laser (in particular, in a case where the YAG laser is used) is preferably 0.01 to 5000 mm/min, more preferably 0.1 to 5000 mm/min, and still more preferably 1 to 5000 mm/min.

In a case where at least one (preferably both) of the output or the scanning speed of the laser is in the above-described range, the adhesion strength in the outer peripheral portion of the contact surface between the second member 20 and the third member 30 of the laminate 100 can be improved, and the adhesion strengths of the members are likely to be adjusted to satisfy the relationship of Expression (1). In particular, in a case where the laminated sheet including the release layer and the pressure-sensitive adhesive layer between the second member and the third member is used as in the laminated sheet 10B, by adjusting at least one of the output or the scanning speed of the laser is in the above-described range, the release layer disposed in the vicinity of the laser-irradiated portion is likely to be selectively removed, and removal of the pressure-sensitive adhesive layer disposed in the vicinity of the laser-irradiated portion can be suppressed.

In addition, in a case where the output and the scanning speed of the laser are in the above-described range, the width of the outer peripheral portion of the bonded portion between the second member and the third member can be easily adjusted to be in a desired range.

[Method of Manufacturing Optical Member]

A method of manufacturing an optical member according to an embodiment of the present invention comprises:

- a step 1 of peeling off the first member from the above-described present laminate to obtain a laminated member where the second member and the third member are laminated in this order;
- a step 2 of obtaining a bonded material by bonding the laminated member and a bonding target such that the bonding target and the second member face each other; and
- a step 3 of peeling off the third member from the bonded material to obtain an optical member.

In the method of manufacturing an optical member according to the embodiment of the present invention, the above-described present laminate is used. Therefore, the first member and the second member can be peeled off in this order.

Figure 6:
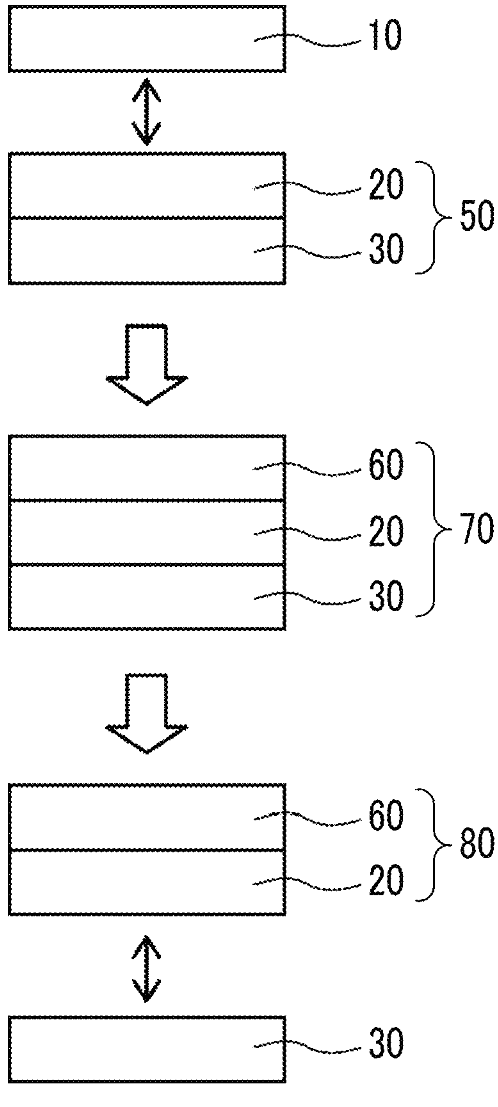
FIG. 6 is a diagram showing an example of a method of manufacturing an optical member according to the present invention.

FIG. 6 is a diagram showing an example of the method of manufacturing the optical member according to the embodiment of the present invention. Hereinafter, each of the steps will be described with reference to FIG. 6.

In the step 1, the first member 10 in the laminate 100 is peeled off. As a result, as shown in FIG. 6, a laminated member 50 where the second member 20 and the third member 30 are laminated in this order is obtained.

Since the second member 20 and the third member 30 are the same as the members having the same reference numerals in the laminate 100, the description thereof will not be repeated.

In the step 2, a bonding target 60 and the laminated member 50 are bonded such that one surface of the bonding target 60 and the second member 20 of the laminated member 50 are in contact with each other. As a result, as shown in FIG. 6, a bonded material 70 where the bonding target 60, the second member 20, and the third member 30 are laminated in this order is obtained.

Specific examples of the bonding target 60 include a lens, a display, and a light guide plate.

In the step 3, the third member 30 in the bonded material 70 is peeled off. As a result, as shown in FIG. 6, an optical member 80 where the bonding target 60 and the second member 20 are laminated in this order is obtained.

The optical member 80 can be used as, for example, a member for virtual reality (VR) glasses or a member for a liquid crystal display.

EXAMPLES

Hereinafter, the present invention will be described in more detail based on the following examples. Materials, used amounts, ratios, treatment details, treatment procedures, and the like shown in the following examples can be appropriately changed within a range not departing from the scope of the present invention. Accordingly, the scope of the present invention is not limited to the following examples.

Example 1

First, a first sheet (corresponding to the sheet 10B of FIG. 3) including a first protective film (material: PET, thickness: 40 μm), a first pressure-sensitive adhesive layer (material: silicone-based pressure sensitive adhesive, thickness: 20 μm), a substrate (material: TAC, thickness: 20 μm), an adhesion layer (material: acrylic pressure sensitive adhesive, thickness 20 μm), and a peeling film (material: PET, thickness: 40 μm) in this order was prepared.

In addition, a second sheet (corresponding to the sheet 20B of FIG. 4) including a liquid crystal layer (material: liquid crystal compound, thickness: 10 μm), a second pressure-sensitive adhesive layer (material: acrylic pressure sensitive adhesive, thickness 5 μm), a release layer (material: silicone resin, thickness: 10 nm), and a second protective film (material: PET, thickness: 40 μm) in this order was prepared.

After peeling the peeling film of the first sheet, the first sheet from which the peeling film was peeled off and the second sheet were bonded such that the adhesion layer and the liquid crystal layer faced each other. As a result, a laminated sheet A1 (corresponding to the laminated sheet 200 of FIG. 2) having a thickness of 155 μm was obtained.

Next, using a laser irradiation device, the surface of the laminated sheet A1 was irradiated and cut with a YAG laser to obtain a laminate B1 (size: a rectangle of length 25 mm×width 100 mm). An output of the laser was 1 W, and a scanning speed of the laser was 1 mm/min.

In addition, the laminate B1 was cut along a laminating direction of the members, and an image of a cut surface of the laminate B1 was observed using a scanning electron microscope (SEM). As a result, it was able to be verified that the release layer was not present and the second pressure-sensitive adhesive layer was present between the liquid crystal layer and the second protective film in a region of up to 100 μm from the periphery of the liquid crystal layer toward a center line in a thickness direction of the cut surface.

<Measurement of Adhesion Strength>

The above-described adhesion strengths C1, C21, and C22 were measured using the laminate B1.

Regarding the adhesion strength C1, in a case where a surface (that is, the second protective film) of the laminate B1 on the third member side was fixed to the substrate using a strong adhesive tape and was peeled off at an interface between the first pressure-sensitive adhesive layer and the substrate, a peeling strength (N/25 mm) was measured. The peeling strength was measured using a device prepared in the company under a condition of a clamp moving speed of 300 mm/min in a 180 degree peeling test according to JIS K6854-2:1999.

The adhesion strength C21 and the adhesion strength C22 were measured as follows. First, by peeling off the first member at an interface between the first pressure-sensitive adhesive layer and the substrate in the laminate B1, a laminate where first member (that is, the first protective film and the first pressure sensitive adhesive layer) was peeled off from the laminate B1 was obtained. In a case where a surface (that is, the substrate) of the obtained laminate on the second member side was fixed to the substrate using a strong adhesive tape and was peeled off at an interface between the release layer or the second protective film and the second pressure-sensitive adhesive layer, a peeling strength (N/25 mm) was obtained. Here, the adhesion strength C21 is a peeling strength in a region of more than 100 μm from the outer edge of the contact surface between the second member and the third member toward the center of the contact surface (that is, the center portion of the contact surface). In addition, the adhesion strength C22 is a peeling strength in a region of up to 100 μm from the outer edge of the contact surface between the second member and the third member toward the center of the contact surface (that is, the outer peripheral portion of the contact surface). A device and conditions used for measuring the adhesion strength C21 and the adhesion strength C22 are the same as the device and the conditions used for measuring the adhesion strength C1.

In the laminate B1, the adhesion strength C1 was 0.10 N/25 mm, the adhesion strength C21 was 0.05 N/25 mm, the adhesion strength C22 was 0.35 N/25 mm, and the relationship of Expression (1) was satisfied.

In addition, it was able to be verified that, in a case where the members corresponding to the first member and the third member were peeled off using the laminate B1 before measuring the adhesion strength, the first member peeled off first.

Example 2

A laminate B2 was obtained using the same method as that of Example 1, except that the second pressure-sensitive adhesive layer in the second sheet was changed to a second pressure-sensitive adhesive layer having a thickness of 15 μm.

The adhesion strengths C1, C21, and C22 were measured using the same method as that of Example 1, except that the laminate B2 was used.

In the laminate B2, the adhesion strength C1 was 0.10 N/25 mm, the adhesion strength C21 was 0.05 N/25 mm, the adhesion strength C22 was 0.35 N/25 mm, and the relationship of Expression (1) was satisfied.

In addition, it was able to be verified that, in a case where the members corresponding to the first member and the third member were peeled off using the laminate B2 before measuring the adhesion strength, the first member peeled off first.

Comparative Example 1

The laminated sheet A1 obtained in Example 1 was cut using a cutter blade to obtain a laminate B3 (size: length 25 mm×width 100 mm).

The above-described adhesion strengths C1, C21, and C22 were measured using the laminate B3.

Here, the measurement of the adhesion strength C1 using the laminate B3 was performed using the same method as that of the measurement of the adhesion strength C1 in the laminate B1, except that, using the laminate where the third member was peeled off from the laminate B3, a sample where the second member was fixed to the second member side was prepared and used.

In addition, the measurement of the adhesion strength C21 and the adhesion strength C22 using the laminate B3 were measured using the same method as that of the measurement of the adhesion strength C21 and the adhesion strength C22 in the laminate B1, except that a sample where the substrate was fixed to the surface of the laminate B3 on the first member side was used.

In the laminate B3, the adhesion strength C1 was 0.10 N/25 mm, the adhesion strength C21 was 0.05 N/25 mm, the adhesion strength C22 was 0.05 N/25 mm, and the relationship of Expression (1) was not satisfied.

In addition, it was able to be verified that, in a case where the members corresponding to the first member and the third member were peeled off using the laminate B3 before measuring the adhesion strength, the third member peeled off first.

EXPLANATION OF REFERENCES

10: first member
10B, 20B: sheet
11, 11A: first protective film
12, 12A: first pressure-sensitive adhesive layer 12
20, 20A: second member
21, 21A: substrate
22, 22A: adhesion layer
23, 23A: liquid crystal layer
24, 24A: second pressure-sensitive adhesive layer
30, 30A: third member
31, 31A: release layer
32, 32A: second protective film
41: peeling film
50: laminated member
60: bonding target
70: bonded material
80: optical member
S: irradiated portion
R: vicinity of irradiated portion

What is claimed is:

1. A method of manufacturing a laminate, the method comprising:

a step of cutting a laminated sheet including a first member, a second member, and a third member in this order with a laser to obtain a laminate comprising, in the following order:

the first member; the second member; and the third member, wherein an adhesion strength in a contact surface between the first member and the second member is represented by C1, an adhesion strength in a center portion of a contact surface between the second member and the third member is represented by C21, and an adhesion strength in at least a part of an outer peripheral portion positioned outside the center portion of the contact surface between the second member and the third member is represented by C22, a requirement of Expression (1) is satisfied, $$C22>C1>C21, \quad \text{Expression (1)}$$

the first member includes a first protective film and a pressure-sensitive adhesive layer, the second member includes a substrate and a liquid crystal layer, the third member includes a second protective film, the pressure-sensitive adhesive in the first member layer faces towards the second member, and the liquid crystal layer in the second member faces towards the third member;

wherein in the laminated sheet, an adhesion strength in a contact surface between the first member and the second member is represented by C1 and an adhesion strength in a contact surface between the second member and the third member is represented by C2, a relationship of Expression (2) is satisfied, $$C1>C2. \quad \text{Expression (2)}$$

* * * * *